Figure 1:
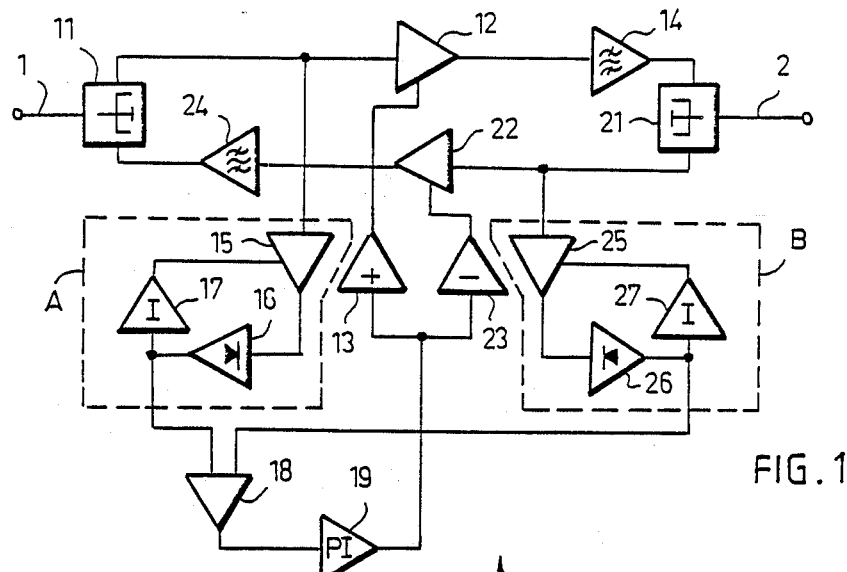

United States Patent [19]

Vesterinen

[11] Patent Number: 4,831,651
[45] Date of Patent: May 16, 1989

[54] INTERMEDIATE AMPLIFIER FOR USE IN TWO-WIRE CONNECTIONS OF A DIAL TELEPHONE NETWORK AND METHOD FOR THE GAIN CONTROL OF SAID AMPLIFIER

[75] Inventor: Seppo Vesterinen, Oulu, Finland
[73] Assignee: Outel Oy, Oulu, Finland
[21] Appl. No.: 35,996
[22] PCT Filed: Aug. 4, 1986
[86] PCT No.: PCT/FI86/00087
  § 371 Date: Mar. 11, 1987
  § 102(e) Date: Mar. 11, 1987
[87] PCT Pub. No.: WO87/00995
  PCT Pub. Date: Feb. 12, 1987
[30] Foreign Application Priority Data
  Aug. 6, 1985 [FI] Finland .................. 853013
[51] Int. Cl.$^4$ ............................................. H04B 3/04
[52] U.S. Cl. ........................................ 379/347; 379/344
[58] Field of Search ............... 379/388, 389, 390, 395, 379/406, 407, 408, 409, 425; 370/32.1, 32

[56]   References Cited
   U.S. PATENT DOCUMENTS

| | | | |
|---|---|---|---|
| 3,128,353 | 4/1964 | Gardner | 379/408 |
| 3,689,711 | 9/1972 | Earle et al. | 379/157 |
| 3,903,378 | 9/1975 | Lee et al. | 379/400 |
| 3,952,166 | 4/1976 | Kato et al. | 379/390 X |
| 4,007,340 | 2/1977 | Russell | 379/425 |
| 4,165,449 | 8/1979 | Vachon | 379/409 |
| 4,488,007 | 12/1984 | Chataignon et al. | 379/395 |
| 4,507,524 | 3/1985 | Yun | 379/389 |
| 4,715,063 | 12/1987 | Haddad et al. | 379/390 |

FOREIGN PATENT DOCUMENTS 2016394 5/1973 Fed. Rep. of Germany ..... 370/32.1
1444828 8/1976 United Kingdom .

Primary Examiner—Jin F. Ng
Assistant Examiner—Randall S. Vaas
Attorney, Agent, or Firm—Dilworth & Barrese

[57]   ABSTRACT

The invention relates to a method for the gain control of an intermediate amplifier used in two-wire connections of a dial telephone network. The invention is also concerned with an intermediate amplifier used in such connections, the direction of the gain of the amplifier being controlled in accordance with the signal strength. The method comprises measuring the amplitudes of signals coming from different transmission directions, comparing the measured amplitudes of signals coming from different directions with each other, and controlling the gain of controllable amplifiers (12, 22) on the basis of the difference value of the amplitudes by applying a control voltage to the controllable amplifiers (12, 22) through reversephase control adapters (13, 23). According to the invention the gain is controlled continuously and steplessly by means of the control voltage, which is continuously adjustable within the linear range thereof, whereby means for controlling the gain of controllable amplifiers (12, 22) comprise a level measuring circuit (A, B) provided separately for both transmission directions, a common difference amplifier (18) connected to the outputs of the level measuring circuits (A, B), and a PI-controller (19) connected to the output of the difference amplifier (18), the output of said controller being connected to the control adapters (13, 23).

4 Claims, 1 Drawing Sheet

INTERMEDIATE AMPLIFIER FOR USE IN TWO-WIRE CONNECTIONS OF A DIAL TELEPHONE NETWORK AND METHOD FOR THE GAIN CONTROL OF SAID AMPLIFIER

The invention relates to a method for the gain control of an intermediate amplifier used in two-wire connection of a dial telephone network. The invention is also concerned with an intermediate amplifier for use in such connections, the direction of the gain of the amplifier being controlled on the basis of the strength of the signal.

The method according to the invention comprises measuring the amplitudes of signals coming from the different directions of transmission, comparing the measured amplitudes of signals coming from the different directions of transmission, and controlling the gain of controllable amplifiers provided separately for the two directions of transmission of an internal four-wire connection of the intermediate amplifier on the basis of the difference value of the amplitudes by applying a control voltage to the controllable amplifiers through reverse-phase control adapters.

Besides the above-mentioned controllable amplifiers provided for the both directions of signal transmission of the internal four-wire connection, the intermediate amplifier according to the invention also comprise means for controlling the controllable amplifiers on the basis of the level difference of signals coming from different directions of transmission, the controlling being effected through reverse-phase adapters.

By means of the amplifier according to the invention it is possible to connect in series two telephone connections of a dial telephone network e.g. in a call transfer device so that the attenuation is kept within the limits of the structural requirements of telephone networks, and the intelligibility of the speech remains good.

Conventional two-wire intermediate amplifiers cannot be applied in the two-wire connections of a dial telephone network, the operation of conventional amplifiers being based on accurately known line impedances (fixed connections of the telephone network) and a tuning effected separately in each particular case.

Variation in the line impedance of a dial telephone network affects the quality of the internal four-wire connection of the intermediate amplifier (the four-wire connection being effected by means of line hybrids tuned at a determined impedance, e.g. 600 Ohm) and, consequently, the coupling begins to oscillate as soon as the total gain of the signal to be fed and a signal coming as a feedback from a reverse direction exceeds the value one.

For the elimination of self-oscillation a two-wire intermediate amplifier must be able to maintain the sum gain of signals travelling in reverse directions at a value below one by means of some kind of automatic control circuit.

Two-wire intermediate amplifiers intended for variable line impedances are typically half-duplex, i.e. they transmit and amplify a signal in one direction at a time.

The oscillation caused by a possible mismatching of a line hybrid is thereby eliminated (no feedback caused by the oscillation); similarly, the attenuation occuring in a telephone connection can be fully compensated alternately in both directions of transmission of the signal.

In this kind of amplifier, the direction of travel of the signal can be typically controlled by means of a reversing switch operating on the basis of speech-frequency signals from different directions, assuming that the information is transmitted alternately from one direction to the other.

In speech transmission, a half-duplex communication functions only in highly advantageous conditions and if both speakers are aware of the principle of alternating speech. Typically, interrupts occur in the information, which causes disturbing non-desirable signals. Moreover, external noises or different attenuations of the lines affect the direction control.

Accordingly, the direction control of an amplifier operating on the switch principle cannot be operated in such a manner that the speech-transmission properties of the device would be acceptable.

In order to improve the speech-transmission properties of two-wire intermediate amplifiers operating on the half-duplex principle, a speech-controlled direction control with a variable gain has been suggested in a loudspeaker telephone application (U.S. Pat. No. 4,507,524), wherein the noises and the interrupts occuring in the information on reversing the direction are tried to be eliminated by means of a "soft" gain reversing based on a time constant. Therein the gain of a signal travelling in the previous direction is attenuated, and the gain of a subsequent signal is increased (the total gain being below one as a function of the control within the range of control). After the time constant the direction of the gain is in the reversed half-duplex state thereof until a signal coming from the opposite direction exceeds the switching level of the reversion of a level comparing circuit.

This kind of loudspeaker telephone amplifier can be considered to be operated on the switch principle on account of the direction control circuits thereof, even if it is provided with linearly controllable amplifiers.

The speech transmission properties of this known solutions are only slightly improved, being at the most passable, because the direction of the gain is locked.

The limited frequency range of a telephone network (300 to 3400 Hz) excluded solutions based on two carrier waves in the transfer of speech information.

A decisive improvement is achieved by means of the direction control of the gain of a two-wire intermediate amplifier according to the invention in the speech transmission properties with respect to the above disadvantages.

This is achieved by means of the method according to the invention by a continuous stepless adjustment of the gain within the linear range thereof by means of a continuously adjustable voltage. The intermediate amplifier according to the invention, in turn, is characterized in that said controlling means comprise:

a level measuring circuit provided separately for both transmission directions, a common difference amplifier connected to the outputs of the level measuring circuits, and a PI-controller connected to the output of the difference amplifier, the output of said controller being connected to the control adapters.

As used herein, the term PI-controller refers to a proportional plus integral controller; an I-controller refers to an integral controller.

The basic idea of the invention thus lies in that the intermediate amplifier is provided with such control means that no predetermined amplitude values must be exceeded for effecting the reversion of the gain, but the direction control voltage is adjusted continuously within the linear range thereof on the basis of the difference value of the amplitudes of signals coming from different transmission directions.

The invention is advantageous mainly in that further connections can be provided for the two-wire connections of a dial telephone network during the transmission of speech information without impairing the audibility or the intelligibility. In practice, the speaking persons do not necessarily notice anything unusual when using the telephone line.

Figure 2:
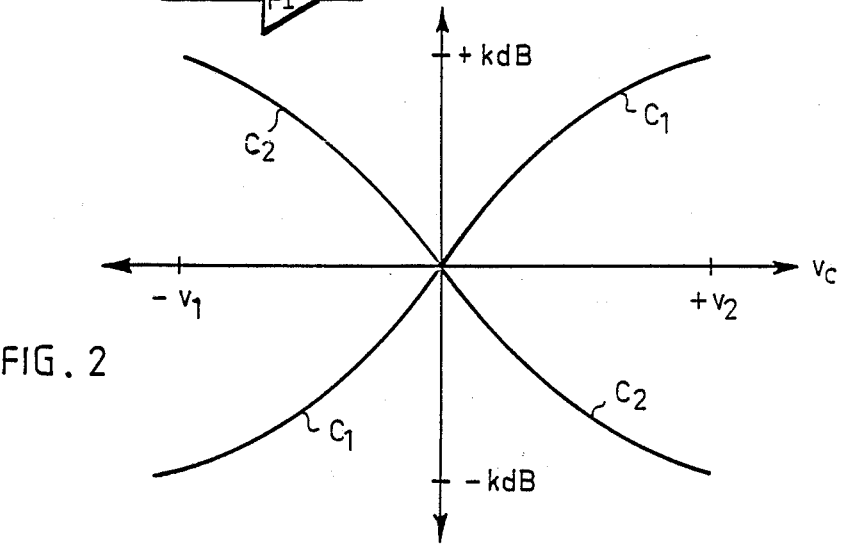
Figure 3:
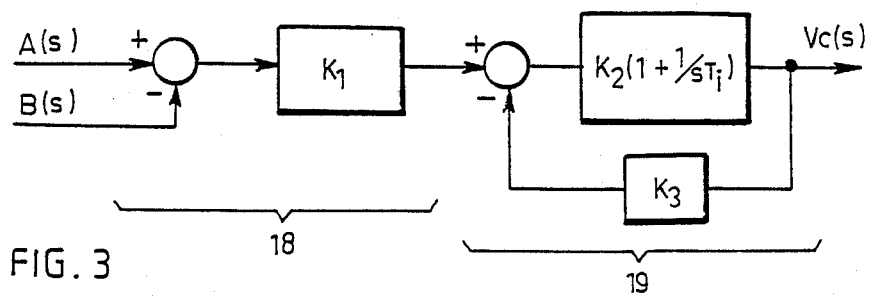

The invention will be described more closely below with reference to the examples of the attached drawings, wherein FIG. 1 is a block diagram of an intermediate amplifier according to the invention, FIG. 2 illustrates a gain curve of the intermediate amplifier as a function of a direction control voltage, and FIG. 3 is a block diagram of a PI-controller used in a direction control circuit.

In FIG. 1, the intermediate amplifier is connected between two two-wire telephone lines 1 and 2. An internal four-wire connection of the amplifier is formed by line hybrids 11 and 21 in order that signals coming from different directions could be separated from each other to be amplified separately. The two transmission directions of the internal four-wire connection are provided with voltage-controlled amplifiers 12 and 22. The input of the controllable amplifier 12 is connected to the line hybrid 11 and output thereof to the line hybrid 21 through a level limiter and wide-band filter circuit 14. The input of the controllable amplifier 22, in turn, is connected to the line hybrid 21 and the output thereof to the line hybrid 11 through a further level limiter and wide-band filter circuit 24. The controllable amplifiers 12 and 22 are intended to compensate attenuation occuring in telephone connections. The level limiter and wide-band filter circuits 14 and 24, in turn, limit the level and the band-width of signals coming to the lines 1 and 2 within the limits of the structural requirements of telephone networks (e.g. 0dbm and 300 to 3 400 Hz).

The input of the controllable amplifier 12 is connected to a level measuring circuit A which is indicated by a dashed line, and the input of the controllable amplifier 22 is connected to the level measuring circuit B, which is similarly indicated by a dashed line. The input of the level measuring circuit A is provided with a voltage-controlled measuring amplifier 15 the output of which is connected to a level indicating circuit 16 the output of which, in turn, is connected to the input of an I-controller 17. The output of the I-controller 17 controls the measuring amplifier 15. The connections of the level measuring circuit B equal to those of the level measuring circuit A, the measuring amplifier, the level indicating circuit, and the I-controller thereof being indicated by the reference numerals 25, 26 and 27 respectively.

The outputs of the level indicating circuits 16 and 26 act as outputs for the level measuring circuits, both said outputs being connected to one and the same difference amplifier 18. The output of the difference amplifier is connected to a PI-controller 19, whereby the control voltage occuring at the output of the PI-controller controls the controllable amplifiers 12 and 22 through reverse-phase control adapters 13 and 23. The control adapters are intended to effect the desired gain curve of the controllable amplifiers 12 and 22 as a function of the control voltage.

If the gain of the controllable amplifiers were fixed and >1, the connection would obviously serve as an oscillator on account of the unideal quality of the line hybrids with varying line impedances, which is characteristic of the two-wire connections of a dial telephone network.

In order to prevent oscillation, the gain curve of FIG. 2 is used in the circuit. The vertical axis representing the gain is logarithmic, and the horizontal axis representing the control voltage $v_c$ occuring at the output of the PI-controller 19 is linear. The extreme limits of the control voltage v are indicated by $-v_1$ and $+v_1$. The curve $C_1$ represents gain effected in one direction and the curve $C_2$ correspondingly gain effected in the reverse direction. As is known, the used gain curve enables the direction control to be effected in such a manner that the sum gain of the feedback never exceeds one (the coupling is thus not self-oscillating). In the mid position of the control voltage the gain in both directions is one (the amplifier thereby compensates only attenuations occuring internally in the coupling). When the control voltage $v_c$ is shifted in either direction from the mid position, the gain increases in one direction and decreases in the other direction. By virtue of the used gain curve, signals from a direction reverse with respect to the direction to be amplified do not become totally inaudible with the exception of the extremes of the range of variation of the control.

In order to provide the two-wire intermediate amplifier effected by means of the gain curve described above with good speech transmission properties, it is necessary according to the invention to use a linear direction control operating dynamically on the basis of speech-frequency signals and capable of compensating the differences between the telephone connections (the attenuation may vary in the connections) as well as the influence of background noises.

The operation of the direction control circuit, which is formed by the level measuring circuits A and B, the difference amplifier 18, and the PI-controller 19, will be described in detail in the following. The voltage levels of signals from different directions are obtained from the level measuring circuits A and B. By virtue of the level control of the measuring the differences between the telephone connections and the effects of the background noises on the direction control can be compensated. FIG. 3 illustrates in more detail the difference amplifier 18 and the PI-controller 19 of FIG. 1. (As is customary in the control engineering, FIG. 3 shows Laplace transforms A(s), B(s) and $v_c$(s) of the time functions a(t), b(t) and $v_c$(t).) The signal levels A(s) and B(s) obtained from the level measuring circuits A and B are applied to the difference amplifier 18 the amplification coefficient of which is indicated by $K_1$. Weighted linear direction data is obtained from the difference amplifier concerning incoming signals, i.e. data which reveals from which direction a higher signal level is obtained. The weighted direction data from the difference amplifier is connected to the PI-controller 19, which acts as a proper direction control for the controllable amplifiers 12 and 22 and the output voltage $v_c$(t) of which corresponds to the control voltage of the gain curve. The PI-controller 19 is provided with a closed control circuit by means of the feedback obtained from the output thereof, the weighted direction data from the difference amplifier being connected as a set value. The amplification coefficient of the feedback is indicated by $K_3$, the P-term of the controller by $K_2$, and the I-term of the controller by $T_1$. This arrangement leads in that the output voltage of the controller, i.e. the control voltage $v_c$ tends to follow variations in the direction data in accordance with a dynamically behaving transfer function typical of the PI-controller. Consequently, the direction control voltage is adjusted to the direction to be amplified in accordance with the direction data at a suitable rate (the I-term calms variations occuring at the output of the controller).

Further, the output of the control circuit tries to reach the mid position of the direction control, when the direction data from the difference amplifier gets the value zero. This is the case when there is no signal on the lines 1 and 2 or when the levels of signals from different directions are equal. Similarly, deviation in the direction data tends to decrease in connection with signals having a longer duration on account of the automatic level adjustment of the level measurement. So the output voltage of the controller (the control voltage $v_c$) cannot get locked at the other extreme thereof on signal levels normally used in telephone networks.

A control circuit effected as described above realizes the gain control of the intermediate amplifier in such a manner that the amplifier operates dynamically between the full-duplex and half-duplex states thereof. The control circuit enables the direction of the gain to be controlled softly but sufficiently rapidly in accordance with the incoming speech signals. The human ear is able to compensate minor level changes occuring at the beginning of words at the reversion stage (the smallest level change noticeable by ear is 3 dB).

As a whole the coupling according to the block diagram described above operates in the speech transmission in the same way as two-wire intermediate amplifiers intended for fixed wires; in a dial telephone network, however, within a wide impedance range without any tunings, i.e. the coupling is not critical to a mismatching of the line hybrids.

Even if the invention has been described above with reference to the example of the attached drawings, it is obvious that the invention is not restricted thereto. So the gain control principle according to the invention can be used in loudspeaker telephones, too. One of the line hybrids is thereby replaced by a combination of a loudspeaker and a microphone.

I claim:

1. An intermediate amplifier used in two-wire connections of a dial telephone network and the direction of the signal strength, said intermediate amplifier including:
   controllable amplifiers (12,22) for both signal transmission directions of an internal four-wire connection, and
   means for controlling the gain of the controllable amplifiers (12,22) on the basis of the level difference of signals coming from different transmission directions, the control being effected through reverse-phase control adapters (13, 23), characterized in that said controlling means comprise:
   a level measuring circuit (A, B) provided separately for both transmission directions,
   a common difference amplifier (18) connected to the outputs of the level measuring circuits (A, B), and
   a proportional plus integral controller (19) connected to the output of the difference amplifier (18), the output of said controller being connected to the control adapters (13, 23).

2. An intermediate amplifier according to claim 1 characterized in that each level measuring circuit includes a controllable measuring amplifier (15, 25), a level indicating circuit (16, 26) connected to the output of the measuring amplifier, and an integral controller (17, 27) connected to the output of the level indicating circuit for controlling the gain of the measuring amplifier (15, 25).

3. An intermediate amplifier according to claim 1 or 2, characterized in that the proportional plus integral controller (19) has a feedback loop.

4. A method for the gain control of an intermediate amplifier used in two-wire connections of a dial telephone network, said intermediate amplifier comprising controllable amplifiers (12,22) provided for both directions of signal transmission of an internal four-wire connection, said method comprising:
   measuring the amplitudes of signals from different directions of transmission,
   comparing (18) the measured amplitudes of signals coming from different directions of transmission with each other for obtaining a difference voltage proportional to the difference of said measured amplitudes,
   supplying said difference voltage to a proportional plus integral controller (19), and
   controlling the gain of said controllable amplifiers (12,22) continuously and steplessly by supplying the output voltage of said proportional plus integral controller to said controllable amplifiers (12,22) through reverse-phase control adapters (13,23) having a stepless and continuous characteristic curve, whereby said output voltage varies continuously within the linear range thereof.

* * * * *

UNITED STATES PATENT AND TRADEMARK OFFICE
CERTIFICATE OF CORRECTION

PATENT NO. : 4,831,651

DATED : May 16, 1989

INVENTOR(S) : Vesterinen

It is certified that error appears in the above-identified patent and that said Letters Patent is hereby corrected as shown below:

In Fig. 2 of the drawings, "+$v_2$" should be --+$v_1$--;

Column 2, line 41    "excluded" should be --excludes--;

Column 4, line 12    "v" should be --$v_c$--;

Column 5, line 50    after "direction" insert --of the gain of which is controlled on the basis--.

Signed and Sealed this

Twenty-sixth Day of December, 1989

Attest:

JEFFREY M. SAMUELS

Attesting Officer  Acting Commissioner of Patents and Trademarks